United States Patent
Ryu et al.

(10) Patent No.: US 12,293,573 B2
(45) Date of Patent: May 6, 2025

(54) APPARATUS AND METHOD FOR GENERATING LEARNING DATA FOR ARTIFICIAL INTELLIGENCE MODEL

(71) Applicant: KOREA INSTITUTE of CIVIL ENGINEERING and BUILDING TECHNOLOGY, Goyang-si (KR)

(72) Inventors: Seung Ki Ryu, Goyang-si (KR); Yeo Hwan Yoon, Goyang-si (KR); Young Seok Kim, Seoul (KR)

(73) Assignee: KOREA INSTITUTE of CIVIL ENGINEERING and BUILDING TECHNOLOGY, Goyang-si (KR)

( * ) Notice: Subject to any disclaimer, the term of this patent is extended or adjusted under 35 U.S.C. 154(b) by 367 days.

(21) Appl. No.: 17/991,908

(22) Filed: Nov. 22, 2022

(65) Prior Publication Data
US 2023/0162484 A1    May 25, 2023

(30) Foreign Application Priority Data
Nov. 22, 2021   (KR) .................. 10-2021-0161479

(51) Int. Cl.
*G06V 10/774* (2022.01)
(52) U.S. Cl.
CPC .................. *G06V 10/774* (2022.01)
(58) Field of Classification Search
CPC .... G06V 10/774; G06V 10/25; G06V 20/176; G06V 20/52; G06F 18/214
USPC .......................................................... 382/159
See application file for complete search history.

(56) References Cited

U.S. PATENT DOCUMENTS

| 10,866,952 B2 * | 12/2020 | Nixon ................... G06F 16/252 |
| 2018/0247220 A1 * | 8/2018 | Assem Aly Salama ..................... G06N 20/00 |
| 2022/0156137 A1 * | 5/2022 | Yoshida .............. G06F 11/3447 |

FOREIGN PATENT DOCUMENTS

| KR | 10-2020-0052425 A | 5/2020 |
| KR | 10-2020-0110979 A | 9/2020 |

OTHER PUBLICATIONS

Office Action of Korean Patent Application No. 10-2021-0161479 mailed Feb. 28, 2022.
Office Action of Korean Patent Application No. 10-2021-0161479 mailed May 24, 2022.

* cited by examiner

*Primary Examiner* — Neil R McLean
(74) *Attorney, Agent, or Firm* — Revolution IP, PLLC

(57) ABSTRACT

The present invention relates to an apparatus and method for generating learning data for an artificial intelligence model, which generate learning data for learning of an artificial intelligence model that detects anomalies of a plant facility, and the apparatus and method collect at least one among structured data and unstructured data, and generate a learning data set for learning of an artificial intelligence model that predicts and diagnoses anomalies of a plant facility using at least one among the structured data and the unstructured data.

4 Claims, 3 Drawing Sheets

APPARATUS AND METHOD FOR GENERATING LEARNING DATA FOR ARTIFICIAL INTELLIGENCE MODEL

BACKGROUND OF THE INVENTION

Field of the Invention

The present invention relates to an apparatus and method for generating learning data for an artificial intelligence model, which generate learning data for learning of an artificial intelligence model that detects anomalies of a plant facility.

BACKGROUND OF THE RELATED ART

Generally, an industrial plant produces a large amount of information, such as numerous drawings, manuals, measurement data, inspection logs, and the like, and carries out construction, operation, and maintenance, as well as design. A large-scale plant having many facilities and complicated processes frequently generates sensor alarms, and among the sensor alarms, various alarms including an abnormal state, i.e., a fault situation, are generated.

Excessive alarms intensify fatigue of operators in performing monitoring works, and this actually overlooks important abnormal alarms and leads to larger failures by missing inspection and replacement intervals. Conventional methods depend on the experience and capability of operators to grasp a situation from numerous alarms generated by sensors installed in numerous facilities of a plant, or manage conditions of the plant facilities through visual inspection of the operators and inspection of measurement devices by an expert. At this point, there is a limit in correctly determining a situation from the numerous alarms, and it is difficult to quickly grasp the situation by visually inspecting a large number of facilities, and there is a limit in inspecting measurement devices in real time by an expert. Due to these limitations, there are limitations and difficulties in performing predictive diagnosis of plant facilities by relying on a small number of operators.

Industrial plants need to monitor the conditions of facilities and devices and predict anomaly symptoms before a failure occurs to prevent further larger damage, and it is common for these activities to grasp the operating states depending on monitoring of sensors installed in the facilities and expertise of the operators. Particularly, in the case of inspection and diagnosis activities, reliability of sensor monitoring and empirical determination of skilled workers are important.

Conventional techniques rely on empirical determination of skilled workers in the activity of analyzing sensor monitoring data of plant facilities, and predictive diagnosis further relies on the experience of skilled workers. A sensor monitoring system is an indispensable component for grasping current states, and the predictive diagnosis is performed on the basis of accumulated sensor data.

A plant is generally equipped with an integrated facility monitoring system (Supervisory Control and Data Acquisition, SCADA) to operate a control system by periodically measuring operating states of facilities and grasping management states in real time to generate an alarm when a reference range set by the operator is exceeded. However, when the reference range is exceeded, excessive alarms of low reliability are generated, and there is a limit in determining causes of generating an alarm and performing predictive diagnosis using the causes. That is, skilled workers comprehensively analyze a situation in relation to various types of alarms, and a lot of time and cost are invested to find out causes of generating an alarm. Although a situation should be recognized not only based on the cause of a single device but also based on comprehensive causes of other facilities or the like with respect to comprehensive alarms that occur in each facility, the conventional monitoring methods have limitations in identifying a cause of an alarm and performing a predictive diagnosis.

Although the sensor monitoring system is mainly used by an operator in the activity of determining conditions of facilities, it generate a problem of excessive information that hinders normal works of the operator, such as generating excessive false alarms and collecting a large amount of data.

SUMMARY OF THE INVENTION

Therefore, the present invention has been made in view of the above problems, and it is an object of the present invention to provide an apparatus and method for generating learning data for an artificial intelligence model, which generate learning data for learning of an artificial intelligence model that detects anomalies of a plant facility by utilizing structured data and unstructured data of the plant facility.

To accomplish the above object, according to one aspect of the present invention, there is provided a learning data generation apparatus for an artificial intelligence model, the apparatus comprising: a collection unit for collecting at least one among structured data and unstructured data; and a processing unit for generating a learning data set for learning of an artificial intelligence model that predicts and diagnoses anomalies of a plant facility using at least one among the structured data and the unstructured data.

The structured data includes at least one among temperature, vibration, pressure, voltage, current, and an image measured by a plurality of sensors installed in the plant facility during an operation of the plant facility.

The processing unit extracts feature information from the structured data using a time domain analysis or a frequency domain analysis, analyzes a correlation between the structured data when an anomaly occurs on the basis of the extracted feature information, and generates the learning data set by generating a matrix map on the basis of the correlation between the structured data.

The unstructured data is an external image of the plant facility acquired by an image sensor.

The processing unit sets a region of interest in the external image, extracts and labels features in the region of interest, classifies the external image into a labeling data set and a non-labeling data set, and generates the learning data set on the basis of the labeling data set.

The processing unit generates the learning data set by fusing a learning data set based on the structured data and a learning data set based on the unstructured data.

According to the embodiments of the present invention, there is provided a learning data generation method for an artificial intelligence model, the method comprising the steps of: collecting at least one among structured data and unstructured data; and generating a learning data set for learning of an artificial intelligence model that predicts and diagnoses anomalies of a plant facility using at least one among the structured data and the unstructured data.

The structured data includes at least one among temperature, vibration, pressure, voltage, current, and an image measured by a plurality of sensors installed in the plant facility during an operation of the plant facility.

The step of generating a learning data set includes the steps of: extracting feature information from the structured data using a time domain analysis or a frequency domain analysis, analyzing a correlation between the structured data when an anomaly occurs on the basis of the extracted feature information, and generating the learning data set by generating a matrix map on the basis of the correlation between the structured data.

The unstructured data is an external image of the plant facility acquired by an image sensor.

The step of generating a learning data set includes the steps of setting a region of interest in the external image, extracting and labels features in the region of interest, classifying the external image into a labeling data set and a non-labeling data set, and generating the learning data set on the basis of the labeling data set.

The step of generating a learning data set includes the step of generating the learning data set by fusing a learning data set based on the structured data and a learning data set based on the unstructured data.

DETAILED DESCRIPTION OF THE PREFERRED EMBODIMENT

Figure 1:
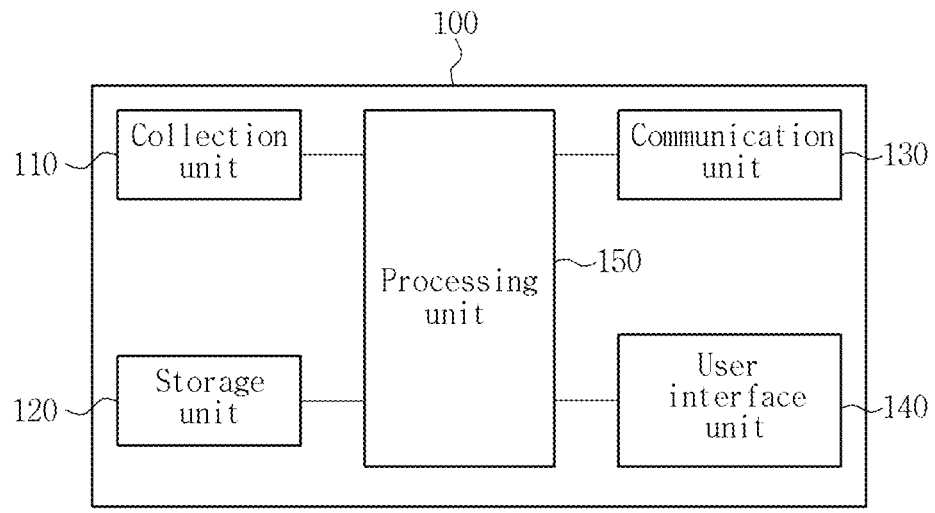
FIG. 1 is a block diagram showing an apparatus for generating learning data according to an embodiment of the present invention.

Hereinafter, some embodiments of the present invention will be described in detail with reference to exemplary drawings. In assigning reference numerals to the components of each drawing, it should be noted that the same components have the same reference numeral as much as possible even though they are shown on different drawings. In addition, in describing the embodiments of the present invention, when it is determined that detailed description of a related known configuration or function interferes with the understanding of the embodiments of the present invention, the detailed description will be omitted.

The object of the present invention is to solve the problem of visual inspection limitation of an operator, a large number of false positive errors or false negative errors of sensors, and disability of precision instrument measuring in real time. Since anomalies or defects of a plant facility (facility equipment) may be generated due to construction, management mistakes, aging, and the like, real-time monitoring and diagnosis activities, such as monitoring at right places and appropriate determination of anomaly states, should be performed at the expert level. In addition, as production loss is large when a facility failure occurs and the cost of the facility itself is also large, introduction of predictive maintenance techniques is becoming more important. The predictive maintenance technique is a technique of predicting failure by acquiring and evaluating degradation or damaged states of facilities.

Existing predictive maintenance techniques diagnose whether there is an anomaly in a facility on the basis of expert determination of determining anomaly by measuring data by a skilled worker himself or herself or determining anomaly by examining sensor data. As the diagnosis method performed by an expert himself or herself may not be performed continuously, there is a limit in managing numerous facilities. Therefore, AI management techniques of determining comprehensive data collected by various sensors of facilities and determining abnormal and unusual situations of expert level using an artificial intelligence (AI) model are introduced. In order for the AI model to reach the level of determination ability of a skilled worker or to make an accurate diagnosis beyond the level, securing data sets that the AI model learns is an essential process.

Hereinafter, a technique of generating a learning data set (learning data) required to train an AI model will be proposed.

FIG. 1 is a block diagram showing an apparatus for generating learning data according to an embodiment of the present invention.

A learning data generation apparatus 100 may diagnose the safety level of a facility through an AI model, and predict soundness of the facility through the safety level. The learning data generation apparatus 100 may classify data on the basis of normal data and abnormal data of the facility that the AI model may learn, and configure a data set for each data type on the basis of the classified data. The learning data generation apparatus 100 may be configured to perform labeling of the data set to meet the purpose of the AI model, create an artificial intelligence network structure to pass an input of state data of the facility through the artificial intelligence network, and output a result of predicting safety and soundness of the facility.

Referring to FIG. 1, the learning data generation apparatus 100 may include a collection unit 110, a storage unit 120, a communication unit 130, a user interface unit 140, and a processing unit 150.

The collection unit 110 may measure structured data and unstructured data of a plant facility as real-time or statistical data by using a plurality of sensors (e.g., temperature sensor, vibration sensor, pressure sensor, current sensor, voltage sensor, thermal imaging camera, image sensor, Global Positioning System (GPS) module, etc.) installed in the plant facility. The collection unit 110 may measure the amount of physical change according to the sampling period and measurement range of the sensors. The structured data is data having time series characteristics (time series data, facility data) and may include physical state information, such as the temperature, vibration, pressure, voltage, current, image, and the like, while the plant facility operates. The unstructured data is data (visual data) for visually determining the external appearance of a plant facility, and may be image data (image) photographed by an image sensor and/or a thermal imaging camera.

The storage unit 120 may store the structured data and the unstructured data measured by the collection unit 110. The storage unit 120 may store the AI model and the learning data set. The storage unit 120 may be a storage medium (non-transitory storage medium) that stores instructions executed by the processing unit 150. The storage unit 120 may temporarily store input data and/or output data of the processing unit 150. The storage unit 120 may include at least one among storage media (recording media) such as flash memory, hard disk, solid-state disk (SSD), embedded multimedia card (eMMC), universal flash storage (UFS), random-access memory (RAM), static random-access memory (SRAM), read only memory (ROM), programmable read only memory (PROM), electrically erasable and programmable ROM (EEPROM), erasable and programmable ROM (EPROM), and/or web storage.

The communication unit 130 may support wired or wireless communication between the processing unit 150 and external electronic devices (e.g., the collection unit 110, an operator's mobile terminal, a server, etc.). The communication unit 130 may include a wireless communication circuit (e.g., a cellular communication circuit, a short-range wireless communication circuit, or a global navigation satellite system (GNSS) communication circuit) or a wired communication circuit (e.g., a local area network (LAN) communication circuit or power line communication circuit), and communicate with the external electronic devices through a short-distance communication network, such as Bluetooth, Wi-Fi direct, or infrared data association (IrDA), or a long-distance communication network, such as a cellular network, the Internet, or a computer network, using a corresponding communication circuit.

The user interface unit 140 may generate data according to handling of a user, or output progress status and results according to operation of the processing unit 150 in the form of visual, auditory and/or tactile information. The user interface unit 140 may include a keyboard, a microphone, a switch, a touch pad, a touch screen, a haptic module, a display, and/or a speaker.

The processing unit 150 may be electrically connected to the collection unit 110, the storage unit 120, the communication unit 130, and the user interface unit 140. The processing unit 150 may control overall operation of the learning data generation apparatus 100. The processing unit 150 may include at least one among processing devices such as an Application Specific Integrated Circuit (ASIC), a Digital Signal Processor (DSP), a Programmable Logic Device (PLD), a Field Programmable Gate Array (FPGA), a Central Processing Unit (CPU), a microcontroller, and/or a microprocessor.

The processing unit 150 may monitor changes in the state of major facilities in real time in the process of operating the plant facility, and automatically determine normal and abnormal changes in the facility using an AI model. The processing unit 150 may acquire facility data (state data of the plant facility) by using the collection unit 110. The processing unit 150 may determine the state of the plant facility by analyzing the facility data acquired using the AI model. The processing unit 150 may detect an abnormal situation in which the facility data is out of a predetermined normal range, and diagnose and determine soundness such as lifespan or the like by using the detection result.

The processing unit 150 may classify the measurement data acquired by the collection unit 110 by data type, analyze meta-information such as attributes and characteristics of the data, and then define data items. The processing unit 150 may collect physical state information of the plant facility by using the collection unit 110.

The processing unit 150 may classify the measurement data obtained by the collection unit 110 into a normal or abnormal (peculiar) situation by analyzing the time series pattern of the measurement data, i.e., the magnitude of measurement amount (Y-axis) and the sampling period (X-axis).

(1) Generate Learning Data Set by Using Structured Data

The processing unit 150 may acquire time series data such as temperature, vibration, pressure, voltage, and current of the plant facility through the collection unit 110. At this point, the processing unit 150 may analyze the interval (frequency) and width (size) of change of specific data that is out of a normal range while changing the sampling period. The processing unit 150 may generate a learning data set for being used to train the AI model by classify a normal group and an abnormal group after classifying pattern types of normal data and abnormal data and classifying the pattern type of the abnormal data.

The processing unit 150 may classify the measurement data (physical data) into normal data or abnormal data on the basis of a predetermined normal range (i.e., a reference value). At this point, the processing unit 150 may classify the measurement data into a normal data group or an abnormal data group in consideration of the frequency of occurrence and duration of the measurement data.

The processing unit 150 may analyze the interval and width of change of specific data that is out of a normal range in consideration of burst frequency. The processing unit 150 may construct a learning data set after classifying pattern types of normal data and abnormal data and classifying the pattern type of the abnormal data by the type of anomaly symptoms.

The processing unit 150 may acquire structured data of time series characteristics through the collection unit 110, and analyze the data characteristics in time domain and frequency domain. When time series data are classified into normal and abnormal data, data types such as data collection period, data size, normal range (or reference value), frequency of occurrence, meaning of feature data, and the like may be classified, and data attributes may be diversely analyzed and characterized together.

The processing unit 150 generates a learning data set through a data characterization process, and may largely go through three steps, i.e., extraction of features from the acquired data, analysis of data correlation, and generation of s matrix map.

Since continuous time series data shows a different sampling period, size, and pattern, the processing unit 150 may intuitively classify, at the step of extracting data features, an anomaly state pattern and a normal pattern through a time domain signal analysis. The processing unit 150 may extract features through a frequency domain analysis as a process of categorizing the features of anomaly state in order to further grasp the feature pattern that is unknown through a time domain analysis.

At the data correlation analysis step, the processing unit 150 may generate a matrix map by analyzing the magnitude, frequency of occurrence, and the like by frequency for the features of anomaly state seen in each variable. The processing unit 150 may analyze the correlation (mutual influence) between variables after analyzing changes in the features of the time domain and the frequency domain of the anomaly state in the same collection section. The processing unit 150 may extract dominant variables by simultaneously analyzing the features of multiple variables such as vibration, temperature, voltage, current, and the like when anomaly occurs. The processing unit 150 may construct a matrix map based on the features of anomaly data after diversely analyzing data of the multiple variables in the time domain and the frequency domain. Since the matrix map has a size of the multiple variables, the processing unit 150 may set a threshold value to generate a binary matrix by classifying data into normal and abnormal.

A learning data set based on a matrix map is generated by classifying a matrix map and a binary matrix map, and may be converted into a binary matrix in consideration of the amount and speed of learning to be used for learning.

For example, a process of generating a time series data matrix map will be described.

① Time series vibration data waveform (normal and abnormal)

Sampling of collection data: tens of Hz or more (high sampling rate that can detect anomaly state)

Reference values such as size, frequency, and the like of anomaly state data waveform Include signal waveform of each anomaly type that distinguishes normal from abnormal, and description of anomaly types ② Frequency conversion waveform of time series signal waveform Describe waveform converted from time series waveform into frequency domain, and anomaly features by frequency Analyze features of anomaly type by frequency: Describe anomaly type of a specific frequency ③ Data augmentation After defining anomaly type by frequency, augment data ④ Generate a matrix map that analyzes cross-correlation such as frequency, occurrence frequency, size, and the like.

When matrix map is generated, group similar matrix maps by anomaly type

After grouping similar matrix maps, define it as specific anomaly type

⑤ Fuse expert knowledge when grouping matrix maps by specific anomaly type

After review of anomaly state diagnosis expert, supplement and generate matrix map ⑥ Separately generate learning data set and test set Data sets are generated to include a learning data set of 80%, a verification data set of 10%, and a test data set of 10%.

(2) Generate Learning Data Set by Using Unstructured Data

The processing unit 150 may acquire an external image (appearance image) of a plant facility by using an image sensor of the collection unit 110. The processing unit 150 may classify the acquired external image into a normal image and an abnormal image. When abnormal peculiar information is detected in the image, the processing unit 150 may determine the corresponding image as an abnormal image. Here, the abnormal peculiar information may be a visually peculiar object such as a coupling problem, facility breakage, water leakage, steam, thermal image, abrupt object, person, or the like.

The processing unit 150 may set a region of interest in an external image acquired by an image sensor (and/or a thermal imaging camera) or the like. The region of interest is an analysis region for automatically extracting an abnormal region, and may be set as a region that increases resolution and recognition performance. For example, the processing unit 150 may extract a plant facility in an image and set a region of interest. The processing unit 150 may crop an image of a corresponding region of interest from the image. At this point, the processing unit 150 may adjust the size of the cropped region of interest image.

The processing unit 150 may combine the region of interest image with location information (GPS data). The processing unit 150 may calculate location information of an object (e.g., facility) in the region of interest by using location information acquired by a GPS module or the like.

The processing unit 150 may extract a feature (feature part) from the region of interest image. The processing unit 150 may calculate and store location information of the extracted feature part. The processing unit 150 may classify the extracted feature into a normal feature and an abnormal feature on the basis of a predetermined rule. The processing unit 150 may perform feature labeling in the region of interest according to the classification result. The processing unit 150 may perform segmentation labeling only on a specific object (visually peculiar object) in the region of interest image.

The processing unit 150 may classify a labeling data set and a non-labeling data set. The labeling data set may include abnormal images including abnormal peculiar information. The processing unit 150 may generate a learning data set and a test data set (verification data set) by using the labeling data set.

The processing unit 150 may design and generate a supervised learning AI model based on the learning data set. The AI model is an image-based deep learning model, and an architecture may be configured as a platform that grasps soundness and predicts risk by detecting facility anomalies. The processing unit 150 may test performance of the AI model by using the test data set. The processing unit 150 may confirm a result of detecting abnormal features. The processing unit 150 may store a result of inference in a database.

When images are continuously input from a fixed-type vision sensor (e.g., image sensor, etc.), the AI model may analyze the input image and determine whether there is an anomaly. The processing unit 150 may transmit an image including an anomaly detected by the AI model, and information on the coordinates thereof to a control server.

(3) Generate Learning Data Set by Using Heterogeneous Data

The processing unit 150 may fuse structured time series data and unstructured visual data. The processing unit 150 may fuse heterogeneous data such as structured data and unstructured data, and visual data and unvisual data. The processing unit 150 may generate a heterogeneous data set for extracting abnormal features by utilizing the fused heterogeneous data.

The processing unit 150 may photograph an external appearance of the plant facility by using an image sensor (camera) in order to extract an abnormal image. At this point, the processing unit 150 may set to include location coordinates and frame time of each frame. The processing unit 150 may perform segmentation labeling in black and white by classifying abnormal features as 1 or 0 in each region of interest, and configure a data set by collecting black and white segmentation data. In addition, the processing unit 150 may generate a pair data set, i.e., a learning data set, from the structured data by matching the matrix map and the frame generated at the same time.

Figure 2:
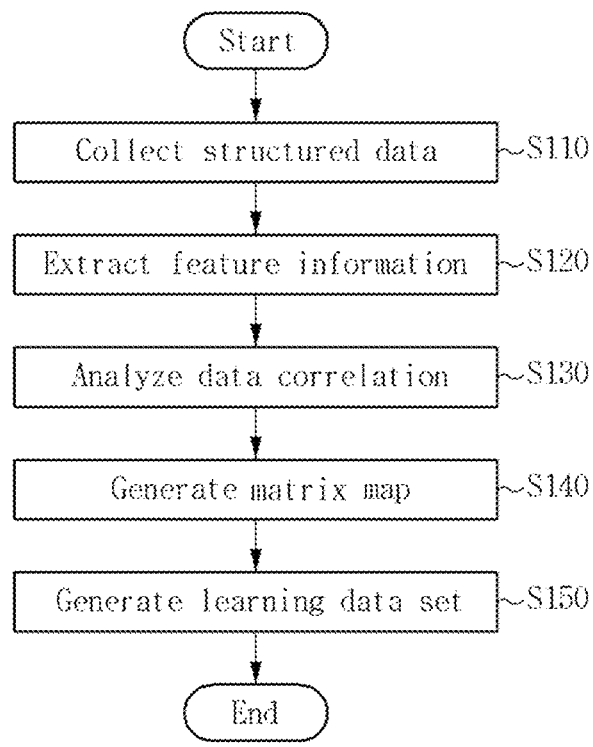
FIG. 2 is a flowchart illustrating a method of generating a learning data set using structured data according to an embodiment of the present invention.

FIG. 2 is a flowchart illustrating a method of generating a learning data set using structured data according to an embodiment of the present invention.

The processing unit 150 may collect structured data by using the collection unit 110 (S110). The structured data may be time series data such as temperature, vibration, pressure, voltage, and current of a plant facility.

The processing unit 150 may extract feature information from the structured data collected through a time domain analysis or a frequency domain analysis (S120). Since the structured data has a different sampling period, size, and pattern, anomaly may be intuitively distinguished. In other words, when the structured data is within a predetermined normal range, the processing unit 150 may determine the structured data as normal data, and when the structured data is out of the predetermined normal range, it may determine the structured data as abnormal data. Although the processing unit 150 classifies the structured data as normal or abnormal through a time domain analysis, the processing unit 150 may classify normal or abnormal through a frequency domain analysis when the structured data may not be classified through the time domain analysis.

The processing unit 150 may analyze the correlation between the data on the basis of the extracted feature information (S130). The processing unit 150 may analyze the correlation between the structured data when an anomaly occurs by analyzing the extracted feature information, i.e., changes in the features.

The processing unit 150 may generate a matrix map on the basis of a result of analyzing the correlation between the data (S140). The processing unit 150 may generate a matrix map on the basis of feature information of abnormal data (anomaly data). In addition, the processing unit 150 may set a threshold value for each structured data (i.e., variable) to generate a binary matrix by classifying the data into normal and abnormal.

The processing unit 150 may generate a learning data set based on the matrix map (S150). When the learning data set is generated, the processing unit 150 may also generate a verification data set and a test data set.

Figure 3:
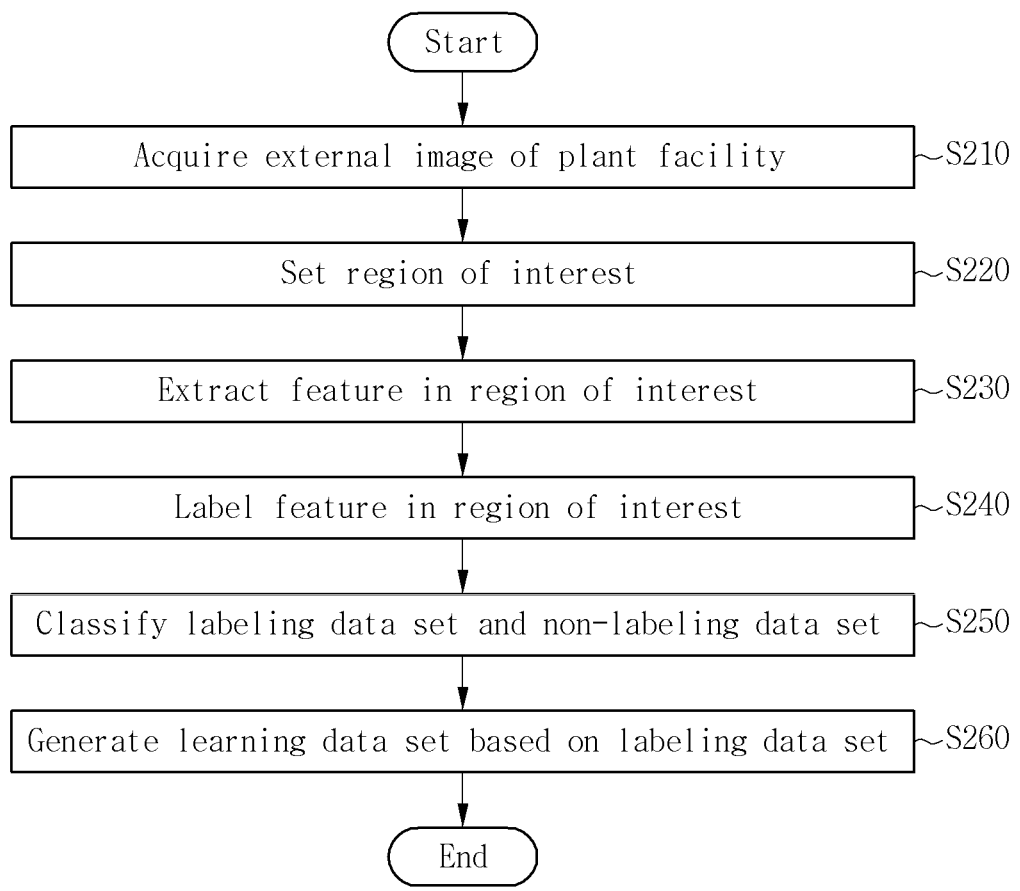
FIG. 3 is a flowchart illustrating a method of generating a learning data set using unstructured data according to an embodiment of the present invention.

FIG. 3 is a flowchart illustrating a method of generating a learning data set using unstructured data according to an embodiment of the present invention.

The processing unit 150 may acquire an external image of the plant facility by using the collection unit 110 (S210). The collection unit 110 may acquire an external image (i.e., unstructured data) of the plant facility by using a vision sensor such as an image sensor or the like.

The processing unit 150 may set a region of interest in the acquired external image (S220). The processing unit 150 may crop a region of interest from the external image, and adjust the size. The processing unit 150 may combine the cropped region of interest image with location information matching the region of interest image.

The processing unit 150 may extract features within the region of interest (S230). The processing unit 150 may classify the features extracted from the region of interest image into normal features and abnormal features.

The processing unit 150 may perform feature labeling within the region of interest (S240). The processing unit 150 may perform labeling on the features extracted from the region of interest.

The processing unit 150 may classify the collected external images into a labeling data set and a non-labeling data set (S250).

The processing unit 150 may generate learning data on the basis of the labeling data set (S260).

Thereafter, the processing unit 150 may train the AI model using the generated learning data. The processing unit 150 may evaluate performance of the trained AI model by using the test data set that is generated together when the learning data is generated.

Figure 4:
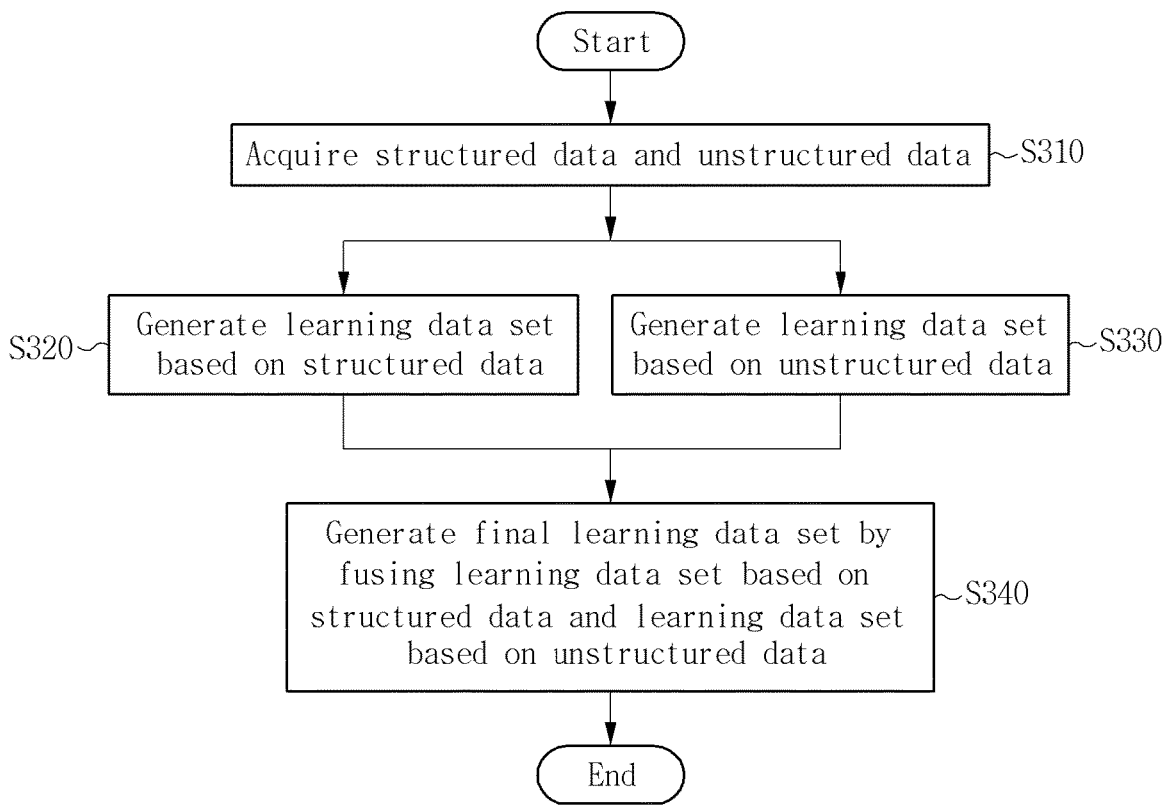
FIG. 4 is a flowchart illustrating a method of generating a learning data set using heterogeneous data according to an embodiment of the present invention.

FIG. 4 is a flowchart illustrating a method of generating a learning data set using heterogeneous data according to an embodiment of the present invention.

The processing unit 150 may acquire structured data and unstructured data (S310). When the structured data and the unstructured data are acquired, the processing unit 150 may store location information and time information matching corresponding data together.

The processing unit 150 may generate a learning data set on the basis of the structured data (S320). The processing unit 150 may generate a learning data set based on structured data according to the learning data set generation method illustrated in FIG. 3.

The processing unit 150 may generate a learning data set on the basis of the unstructured data (S330). The processing unit 150 may generate a learning data set based on unstructured data according to the learning data set generation method illustrated in FIG. 4.

The processing unit 150 may generate a final learning data set by fusing the learning data set based on structured data and the learning data set based on unstructured data (S340). The processing unit 150 may generate the learning data set by matching the two learning data sets on the basis of location information and time information included in the structured data and unstructured data.

The present invention may generate learning data for learning of an artificial intelligence model that detects anomalies of a plant facility by utilizing structured data and unstructured data of the plant facility.

In addition, as the present invention trains the artificial intelligence model by using the learning data generated on the basis of structured data and unstructured data of a plant facility, predictive ability of the artificial intelligence model for predicting (diagnosing) safety and soundness of the plant facility can be improved.

The above description merely illustrates the technical spirit of the present invention, and various changes and modifications can be made by those skilled in the art without departing from the essential characteristics of the present invention. Therefore, the embodiments disclosed in the present invention are not intended to limit, but to explain, the technical spirit of the present invention, and the scope of the technical spirit of the present invention is not limited by these embodiments. The protection scope of the present invention should be interpreted by the following claims, and all technical spirits within the scope equivalent thereto should be construed as being included in the scope of the present invention.

DESCRIPTION OF SYMBOLS

100: Learning data generation apparatus
110: Collection unit
120: Storage unit
130: Communication unit
140: User interface unit
150: Processing unit

What is claimed is:

1. A learning data generation apparatus comprising:
a collection unit for collecting at least one among structured data and unstructured data; and
a processing unit for generating a learning data set for learning of an artificial intelligence model that predicts and diagnoses anomalies of a plant facility using at least one among the structured data and the unstructured data, wherein
the unstructured data is an external image of the plant facility acquired by an image sensor, and
when the learning data set is generated from the structured data, the processing unit extracts feature information of anomaly data by classifying the structured data into normal data corresponding to a normal pattern and anomaly data corresponding to an anomaly pattern by using a time domain analysis, extracts feature information of the anomaly data from the structured data through a frequency domain analysis in order to grasp a feature pattern that is unknown through the time domain analysis, analyzes a correlation between the anomaly data among the structured data by analyzing magnitude and frequency of occurrence by frequency for the extracted feature information of the anomaly data in consideration of a time domain and a frequency domain, and generates the learning data, after generating a plurality of matrix maps on the basis of the correlation between the analyzed anomaly data, by grouping the matrix maps by anomaly type, and when the learning data set is generated from the unstructured data, the processing unit sets a region of interest in the external image, extracts features from the region of interest and stores the features in combination with location information of an object in the region of interest, classifies the extracted features into normal features and abnormal features, generates a labeling data set by performing labeling on the region of interest or the external image containing the anomaly features, and generates the learning data set on the basis of the labeling data set, and wherein the processing unit generates the learning data set by fusing a learning data set based on the structured data and a learning data set based on the unstructured data.

2. The apparatus according to claim 1, wherein the structured data includes at least one among temperature, vibration, pressure, voltage, current, and an image measured by a plurality of sensors installed in the plant facility during an operation of the plant facility.

3. A learning data generation method of a learning data generation apparatus, the method comprising the steps of:
collecting at least one among structured data and unstructured data, by the learning data generation apparatus; and generating a learning data set for learning of an artificial intelligence model that predicts and diagnoses anomalies of a plant facility using at least one among the structured data and the unstructured data, by the learning data generation apparatus, wherein the unstructured data is an external image of the plant facility acquired by an image sensor, and when the learning data set is generated from the structured data, the step of generating a learning data set includes the steps of:

extracting feature information of anomaly data by classifying the structured data into normal data corresponding to a normal pattern and anomaly data corresponding to an anomaly pattern by using a time domain analysis;

extracting feature information of the anomaly data from the structured data through a frequency domain analysis in order to grasp a feature pattern that is unknown through the time domain analysis;

analyzing a correlation between the anomaly data among the structured data by analyzing magnitude and frequency of occurrence by frequency for the extracted feature information of the anomaly data in consideration of a time domain and a frequency domain; and generating the learning data, after generating a plurality of matrix maps on the basis of the correlation between the analyzed anomaly data, by grouping the matrix maps by anomaly type, and when the learning data set is generated from the unstructured data, the step of generating a learning data set includes the steps of:

setting a region of interest in the external image;

extracting features from the region of interest and storing the features in combination with location information of an object in the region of interest;

classifying the extracted features into normal features and abnormal features;

generating a labeling data set by performing labeling on the region of interest or the external image containing the anomaly features; and generating the learning data set on the basis of the labeling data set, and wherein the step of generating the learning data set includes a step of fusing a learning data set based on the structured data and a learning data set based on the unstructured data.

4. The method according to claim 3, wherein the structured data includes at least one among temperature, vibration, pressure, voltage, current, and an image measured by a plurality of sensors installed in the plant facility during an operation of the plant facility.

* * * * *